(12) United States Patent
Xie et al.

(10) Patent No.: US 8,755,345 B2
(45) Date of Patent: Jun. 17, 2014

(54) METHOD AND SYSTEM FOR RESOURCE DISTRIBUTION, BLIND DETECTION METHOD, BASE STATION, USER EQUIPMENT

(75) Inventors: Jianhong Xie, Shenzhen (CN); Hongxia Gong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 101 days.

(21) Appl. No.: 13/379,017

(22) PCT Filed: Jun. 22, 2010

(86) PCT No.: PCT/CN2010/074252
§ 371 (c)(1),
(2), (4) Date: Dec. 17, 2011

(87) PCT Pub. No.: WO2010/145570
PCT Pub. Date: Dec. 23, 2010

(65) Prior Publication Data
US 2012/0230266 A1    Sep. 13, 2012

(30) Foreign Application Priority Data
Nov. 3, 2009    (CN) .......................... 2009 1 0207436

(51) Int. Cl.
H04W 4/00 (2009.01)
H04W 72/00 (2009.01)
H04L 5/00 (2006.01)
H04W 72/04 (2009.01)

(52) U.S. Cl.
CPC ......... *H04L 5/0053* (2013.01); *H04W 72/0493* (2013.01); *H04W 72/042* (2013.01)
USPC ............ 370/329; 370/328; 370/330; 455/450

(58) Field of Classification Search
None
See application file for complete search history.

(56) References Cited

U.S. PATENT DOCUMENTS

2006/0140110 A1* 6/2006 Lin ............................... 370/208
(Continued)

FOREIGN PATENT DOCUMENTS

| CN | 101001422 A | 7/2007 |
| CN | 101378306 A | 3/2009 |

(Continued)

OTHER PUBLICATIONS

Motorola, Search Space Definition for L1/L2 Control Channels, 3GPP TSG RAN1 #50, R1-073373, Aug. 24, 2007.

(Continued)

*Primary Examiner* — Ayaz Sheikh
*Assistant Examiner* — Mariela Vidal Carpio
(74) *Attorney, Agent, or Firm* — Ling Wu; Stephen Yang; Ling and Wang Intellectual Property LLC (57) ABSTRACT

The invention discloses a method for allocating resource including: a base station calculating a number of PDCCH aggregation degree groups based on CCE resources which can be occupied by PDCCH in a subframe, wherein PDCCH aggregation degree groups are divided based on a largest PDCCH aggregation degree; the base station setting at least one aggregation degree group in the middle of the total PDCCH aggregation degree groups as a common search space; and the base station, based on UE information and common information, determining PDCCH aggregation degree groups which are set as a UE specified search space using a space division function; and the base station searching a location of the UE specified search space in determined PDCCH aggregation degree groups which are set as the UE specified search space and performing PDCCH resource allocation. The invention achieves simplification of allocation modes and improves efficiency of PDCCH resource allocation.

11 Claims, 8 Drawing Sheets

(56) References Cited

U.S. PATENT DOCUMENTS

| | | | |
|---|---|---|---|
| 2009/0238091 A1* | 9/2009 | Kim et al. | 370/252 |
| 2010/0260124 A1* | 10/2010 | Noshio et al. | 370/329 |
| 2010/0304689 A1* | 12/2010 | McBeath et al. | 455/68 |
| 2011/0021228 A1* | 1/2011 | Kim et al. | 455/507 |
| 2011/0032884 A1* | 2/2011 | Yu et al. | 370/329 |
| 2011/0038275 A1* | 2/2011 | Kim et al. | 370/252 |
| 2011/0310856 A1* | 12/2011 | Hariharan et al. | 370/336 |

FOREIGN PATENT DOCUMENTS

| | | | | |
|---|---|---|---|---|
| CN | 101702828 A | 5/2010 | | |
| WO | WO2009/057283 | * | 5/2009 | H04Q 7/38 |
| WO | 2009098568 A2 | | 8/2009 | |

OTHER PUBLICATIONS

International Search Report for PCT/CN2010/074252 dated Sep. 1, 2010.

R1-082869, 3GPP TSG RAN WG1 #54, 36.213 CR043r2 (Rel-8, F) Clarification on tree structure of CCE aggregations, Aug. 18-22, 2008, Jeju, Korea, see pp. 1-3.

R1-081522, TSG-RAN WG1 #52bis, Summary of email discussion on DL control signaling, Mar. 31-Apr. 4 2008, Shenzhen, China, see pp. 1-7.

* cited by examiner

METHOD AND SYSTEM FOR RESOURCE DISTRIBUTION, BLIND DETECTION METHOD, BASE STATION, USER EQUIPMENT

TECHNICAL FIELD

The invention relates to the communication field and, in particular, to a method and a system for allocating resources of a downlink control channel for use by long term evolution, a method for blind detection, a base station and a user equipment.

BACKGROUND OF THE RELATED ART

The Physical Downlink Control Channel (PDCCH) is a very important downlink physical channel in a Long Term Evolution (LTE) system. PDCCH transmits downlink control information and can be is used for scheduling the Physical Uplink Shared Channel (PUSCH) of User Equipment (UE) and allocating occupancy resources, and also for informing UE of modulation mode of service data associated therewith on the Physical Downlink Shared Channel (PDSCH) and resource occupancy conditions and so on so as to achieve correctly receiving and decoding service data by UE. The number of Orthogonal Frequency Division Multiplexing (OFDM) symbols that can be occupied by PDCCH is determined by the content transmitted by the Physical Control Format Indicator Channel (PCFICH). If there is Hybrid Automatic Repeat Request (HARM) information, then part of resources determined by PCFICH will also be occupied by the Physical Hybrid-ARQ Indicator Channel (PHICH) and only the rest resources can be used for PDCCH. LTE protocol stipulates that the resource occupied by PDCCH is allocated by taking the Control Channel Element (CCE) as a basic unit and finally CCE is mapped on specific physical resources and meanwhile stipulates that UE shall perform blind detection on the received data by taking CCE as a basic unit to resolve control information that belongs to the UE.

Currently, resource allocation of CCE is performed directly by taking one CCE as the unit. If the numbers of occupied CCEs (i.e., aggregation degree) by certain UE in different Transmission Time Intervals (TTI) are different, a base station needs to fully re-calculate in resource allocation, and similarly the search location of UE in blind detection shall also be re-calculated, which brings inconvenience to both resource allocation and blind detection. Meanwhile, the decoding rate of the control channel will affect demodulation and decoding of downlink data and also will affect uplink flow and downlink flow of the whole system. To improve sending processing speed and receiving processing speed of PDCCH and ensure uplink flow and downlink flow, it is required to improve the resource allocation efficiency, lower complexity of resource allocation at the side of the base station, and reduce times of blind detection for UE at the same time when keeping flexibility of resource allocation. However, no effective solution for solving said problem has been proposed yet.

SUMMARY OF THE INVENTION

This invention is made in consideration of the problem in the prior art that a relatively complex PDCCH resource allocation scheme leads to low efficiency of PDCCH resource allocation. Therefore, it is the major object of this invention to provide a method and a system for allocating resources of a downlink control channel for use by long term evolution, a method for blind detection, a base station and user equipment so as to solve the above problem in the prior art.

According to one embodiment of this invention, a method for allocating resources is provided.

The method according to one embodiment of this invention comprises: a base station calculating a number of PDCCH aggregation degree groups based on CCE resources which can be occupied by PDCCH in a subframe, wherein a largest PDCCH aggregation degree is taken as the PDCCH aggregation degree group; the base station setting at least one aggregation degree group in middle of total PDCCH aggregation degree groups as a common search space; the base station determining PDCCH aggregation degree groups where a UE specified search space is located using a space division function based on UE information and common information; and the base station searching a location of the UE specified search space in determined PDCCH aggregation degree groups where the UE specified search space is located and performing PDCCH resource allocation.

According to one embodiment of this invention, a method for blind detection is further provided.

The method according to one embodiment of this invention comprises: UE detecting common control information in at least one aggregation degree group in middle of total PDCCH aggregation degree groups according to a predetermined blind detection mode; the UE determining PDCCH aggregation degree groups where a UE specified search space is located according to a predetermined space division function based on identification information of UE and common information; and the UE detecting UE specified control information on PDCCH aggregation degree groups where the UE specified search space is located and groups adjacent to the PDCCH aggregation degree groups where the UE specified search space is located according to a predetermined blind detection mode.

According to one embodiment of this invention, a base station is further provided.

The base station according to one embodiment of this invention comprises:

an aggregation degree group calculation module, which is configured to: calculate a number of PDCCH aggregation degree groups based on CCE resources that can be occupied by PDCCH in a subframe, wherein a largest PDCCH aggregation degree is taken as the PDCCH aggregation degree group;

a common search space configuration module, which is configured to: set at least one aggregation degree group in middle of total PDCCH aggregation degree groups as a common search space;

a UE specified control information determination module, which is configured to: determine PDCCH aggregation degree groups where a UE specified search space is located using a space division function based on UE information and common information; and a resource allocation module, which is configured to: search a location of the UE specified search space within determined PDCCH aggregation degree groups where the UE specified search space is located and perform PDCCH resource allocation.

According to one embodiment of this invention, user equipment is further provided.

The user equipment according to one embodiment of this invention comprises:

a common control information detection module, which is configured to: detect common control information in at least one aggregation degree group in middle of total PDCCH aggregation degree groups according to a predetermined blind detection mode;

a UE specified control information determination module, which is configured to: determine PDCCH aggregation degree groups where a UE specified search space is located according to a predetermined space division function based on identification information of UE and common information; and a UE specified control information detection module, which is configured to: detect UE specified control information on PDCCH aggregation degree groups where the UE specified search space is located and groups adjacent to the PDCCH aggregation degree groups where the UE specified search space is located according to a predetermined blind detection mode.

According to one embodiment of this invention, a system for allocating resources is further provided.

The system according to one embodiment of this invention comprises:

a base station, which comprises:
an aggregation degree group calculation module, which is configured to: calculate a number of PDCCH aggregation degree groups based on CCE resources that can be occupied by PDCCH in a subframe, wherein a largest PDCCH aggregation degree is taken as the PDCCH aggregation degree group;
a common search space configuration module, which is configured to: set at least one aggregation degree group in middle of total PDCCH aggregation degree groups as a common search space;
a first UE specified control information determination module, which is configured to: determine PDCCH aggregation degree groups where a UE specified search space is located using a space division function based on UE information and common information; and
a resource allocation module, which is configured to: search a location of the UE specified search space within said determined PDCCH aggregation degree groups where the UE specified search space is located and perform PDCCH resource allocation; and user equipment, which comprises:
a common control information detection module, which is configured to: detect common control information in at least one aggregation degree group in the middle of the total PDCCH aggregation degree groups according to a predetermined blind detection mode;
a second UE specified control information determination module, which is configured to: determine PDCCH aggregation degree groups where the UE specified search space is located according to the space division function based on identification information of UE and common information; and
a UE specified control information detection module, which is configured to: detect UE specified control information for PDCCH aggregation degree groups where the UE specified search space is located and groups adjacent to the PDCCH aggregation degree groups where the UE specified search space is located according to a predetermined blind detection mode.

Compared with the prior art, according to this invention, grouping based on the largest CCE aggregation degree and resource allocation of CCEs with different aggregation degrees are performed to ensure unity of group numbers of selectable aggregation degrees within the L-CCE aggregation degree, achieve simplification of the allocation mode and improve efficiency of PDCCH resource allocation.

BRIEF DESCRIPTION OF DRAWINGS

The accompanying drawings described herein are provided for further understanding on this invention and compose a part of this invention. The schematic embodiments of this invention and description thereof are used for explaining this invention but do not constitute unduly definitions on this invention. In the drawings.

PREFERRED EMBODIMENTS OF THE PRESENT INVENTION

The major idea of this invention mainly is that grouping based on the largest CCE (L-CCE) aggregation degree and resource allocation of CCE with different aggregation degrees are performed to ensure unity of group numbers of selectable aggregation degrees within the L-CCE aggregation degree and achieve simplification of the allocation mode. The middle of the resource grid is configured as a common search space. A resource space is divided into a plurality of sub-spaces according to a division function, which reduces the size of allocation space of the resources occupied by the specific UE specified control information. The resources occupied by the UE specified control information is determined in accordance with the process of sub-spaces first and then L-CCE groups and finally CCE, which represents a resource allocation mode from the coarse granularity to the fine granularity.

To make the object, the technical scheme and advantages of this invention clearer, the followings make a further detailed explanation on this invention in combination with accompanying drawings and the specific embodiments.

Method Embodiment

According to one embodiment of this invention, a method for allocating resources of PDCCH for use by LTE is provided.

Figure 1:
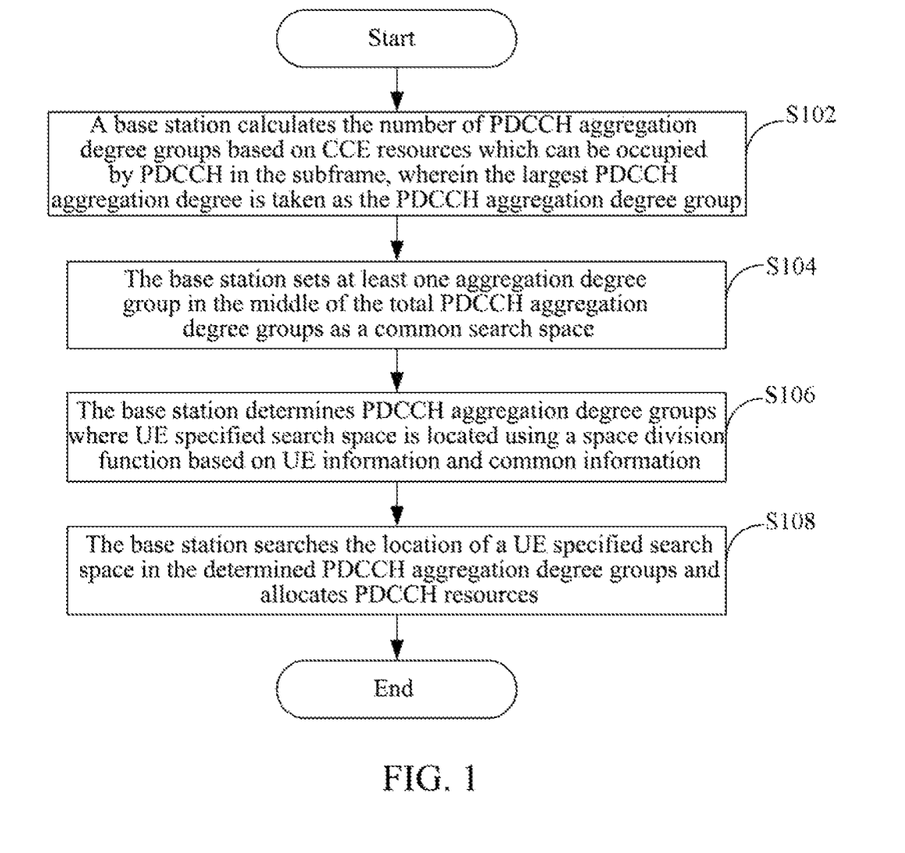
FIG. 1 is a flowchart illustrating a method for allocating resources in accordance with one embodiment of this invention.

FIG. 1 is a flowchart showing a method for allocating resources of a downlink control channel according to one embodiment of this invention. As shown in FIG. 1, the method comprises:

step S102, a base station calculates the number of PDCCH aggregation degree groups based on control CCE resources which can be occupied by PDCCH in the subframe, wherein the largest PDCCH aggregation degree is taken as a PDCCH aggregation degree group;

step S104, the base station sets at least one aggregation degree group in the middle of the total PDCCH aggregation degree groups as a common search space;

step S106, the base station determines a PDCCH aggregation degree group where the UE specified search space is located using a space division function based on UE information and common information;

step S108, the base station searches the location of the UE specified search space in the determined PDCCH aggregation degree group to allocate PDCCH resources.

Figure 2:
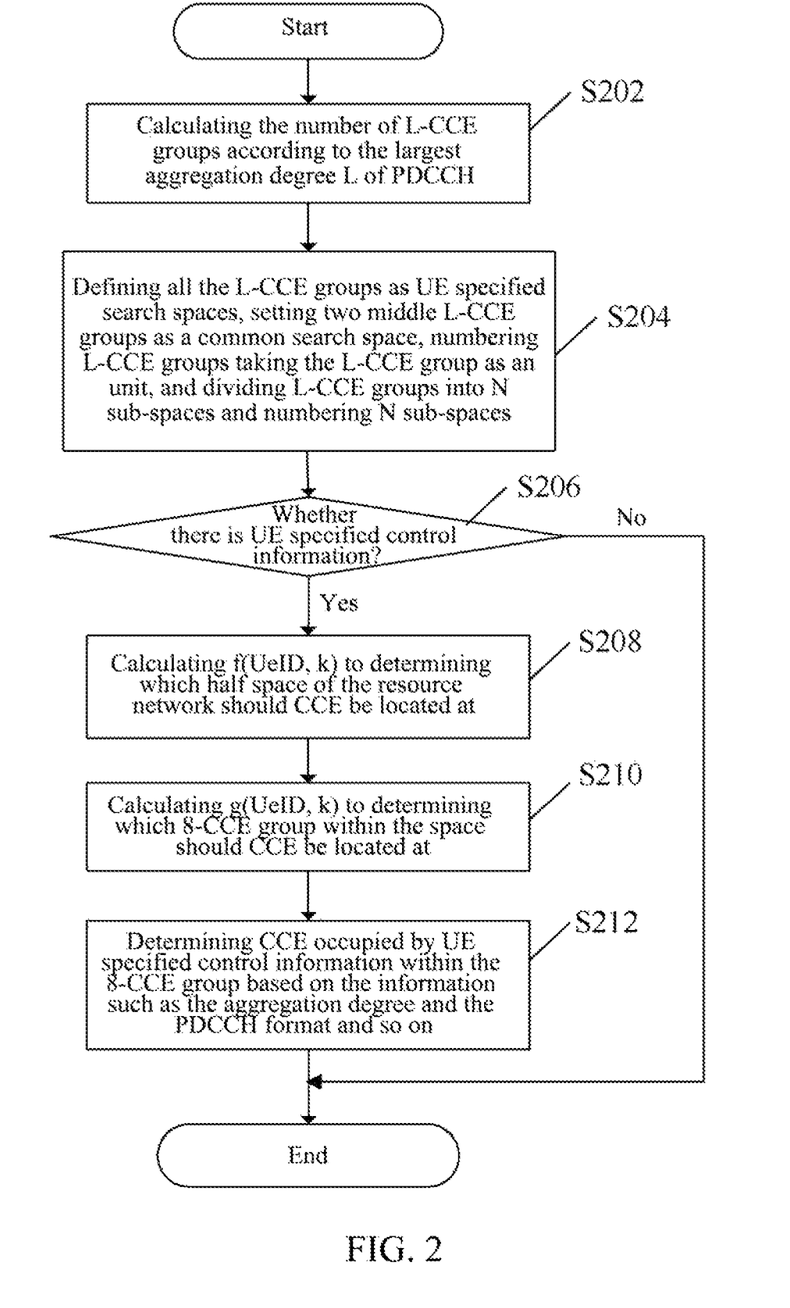
FIG. 2 is a flowchart illustrating a preferred processing scheme of the method for allocating resources in accordance with one embodiment of this invention.

The following describes the details of the above respective processing in detail in combination with FIG. 2. FIG.2 is a flowchart of a preferred processing scheme of the method for allocating resources according to one embodiment of this invention. As shown in FIG. 2, the processing specifically comprises the steps of:

step S202, the number of L-CCE groups is calculated according to the largest aggregation degree L of PDCCH based on the largest number of resources which can be occupied by PDCCH in k (k, k ∈ {0, 1, . . . 9}) subframes.

For example, L=8 (if protocol is adjusted, L may also be adjusted accordingly) in accordance with the existing protocol, the number of CCEs $N_{CCE,k}$=87 and the number of 8-CCE groups $N_{L-CCE,k}$=11 with respect to the configuration of 20M cell, dual antennae, Control Format Indicator (CFI)=3 and PHICH being 3 groups, and the calculation method for other bandwidths and under other configuration is similar therewith and is not repeated here, where the number of CCEs can be calculated according to the following method:

first, determining the total number of Resource Element Groups (REG) by the number of cell antennae, the cell bandwidth and CFI in this TTI; then, respectively calculating the numbers of REGs occupied by PCFICH and PHICH, obtaining the number of REGs that can be occupied by PDCCH by subtracting the number of REGs occupied by PCFICH and PHICH from the total number of REGs, and finally determining the number of CCEs based on the relationship of 1 CCE being equal to 9 REGs;

step S204, all the L-CCE groups are defined as a UE specified search space based on the number of L-CCE groups obtained by calculation, two middle L-CCEs are configured as a common search space, L-CCE groups are numbered by 0, 1 . . . L-1 taking the L-CCE group as the unit, and L-CCE groups are divided into N sub-spaces and N sub-spaces are numbered. The division methods are the same for different numbers of sub-spaces.

Figure 3A:
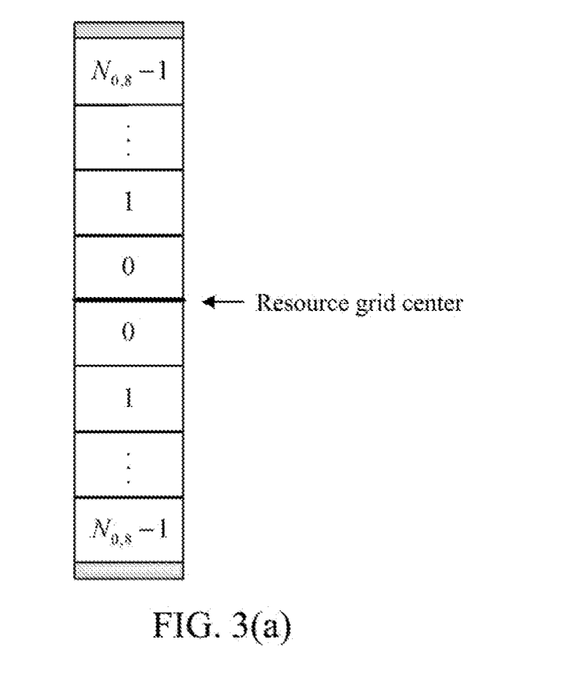
FIG. 3(a), FIG. 3(b) and FIG. 3(c) are schematic diagrams illustrating numbering and allocating of CCE in the process of resource allocation in accordance with one embodiment of this invention.
Figure 3B:
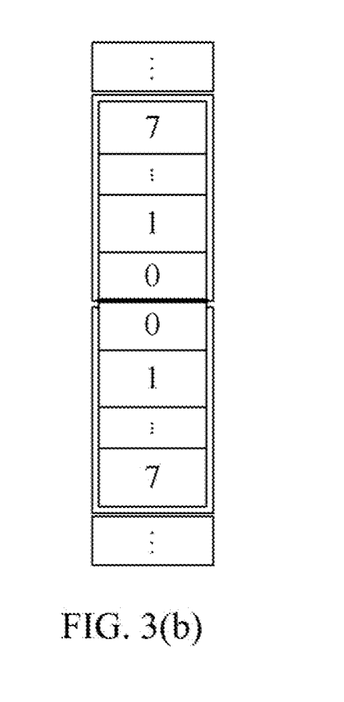
Figure 3C:
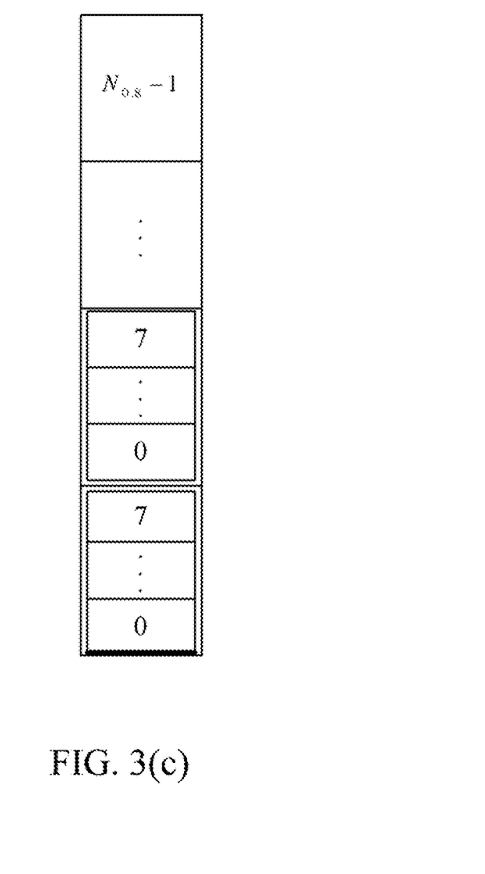
Figure 4:
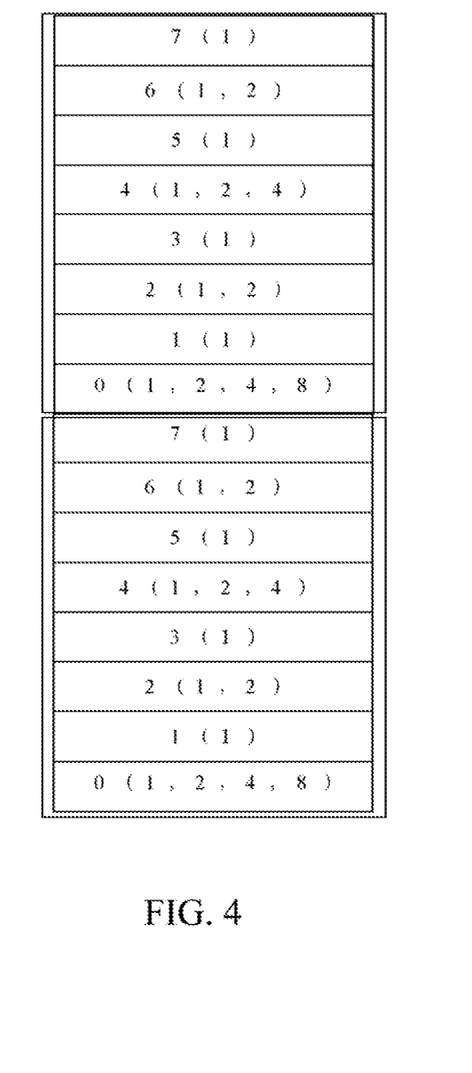
FIG. 4 is a schematic diagram illustrating different CCE aggregation degrees blindly detected by UE in accordance with one embodiment of this invention.

Take N=2 as an example, the largest number of the L-CCE group in the sub-spaces is $N_{0,L}=N_{L-CCE,k}/N$=5, and the L-CCE groups are numbered from the middle to the two ends in respective sub-spaces according to the sequence of 0, 1 . . . 4, as shown in FIG. 3(a); the common search space is as shown in FIG. 3(b), and the numbers in L-CCE groups are as shown in FIG. 3(c);

step S206, it is judged whether UE specified control information exists; if yes, step S208 is performed; otherwise, this flow is ended;

step S208, the sub-space $S_{k,UEID}$ where CCE occupied by UE specified control information is determined by a sub-space division function f(UeID,k)=$Y_k$ mod N based on UE ID, the time slot number $n_s$, $n_s$ ∈ {0, 1 . . . 19}, and the subframe number k, wherein $Y_k$ has been provided in protocol 36.212;

step S210, the L-CCE group number $NO_{k,UEID}$ of CCE occupied by UE specified control information in the sub-space $S_{k,UEID}$ is determined by the group division function g(UeID,k)=L·{$Y_k$ mod $NO_{k,UEID}$} based on the calculated value of $Y_k$;

step S212, a location satisfying the aggregation degree is searched in the L-CCE groups with a sub-space number $S_{k,UEID}$ and a number within the space $NO_{k,UEID}$ based on the aggregation degree of PDCCH, and allocation of CCE occupied by UE specified control information is completed, wherein the possible PDCCH aggregation degrees are as shown in FIG. 4.

Preferably, in order to better complete the search of CCE satisfying requirements, the base station can complete rapid lookup by maintaining a resource allocation table.

After the base station performs the above processing, blind detection and the following processing are performed on PDCCH at UE side after UE receiving PDCCH.

According to one embodiment of this invention, a method for blind detection of PDCCH in LTE is further provided.

Figure 5:
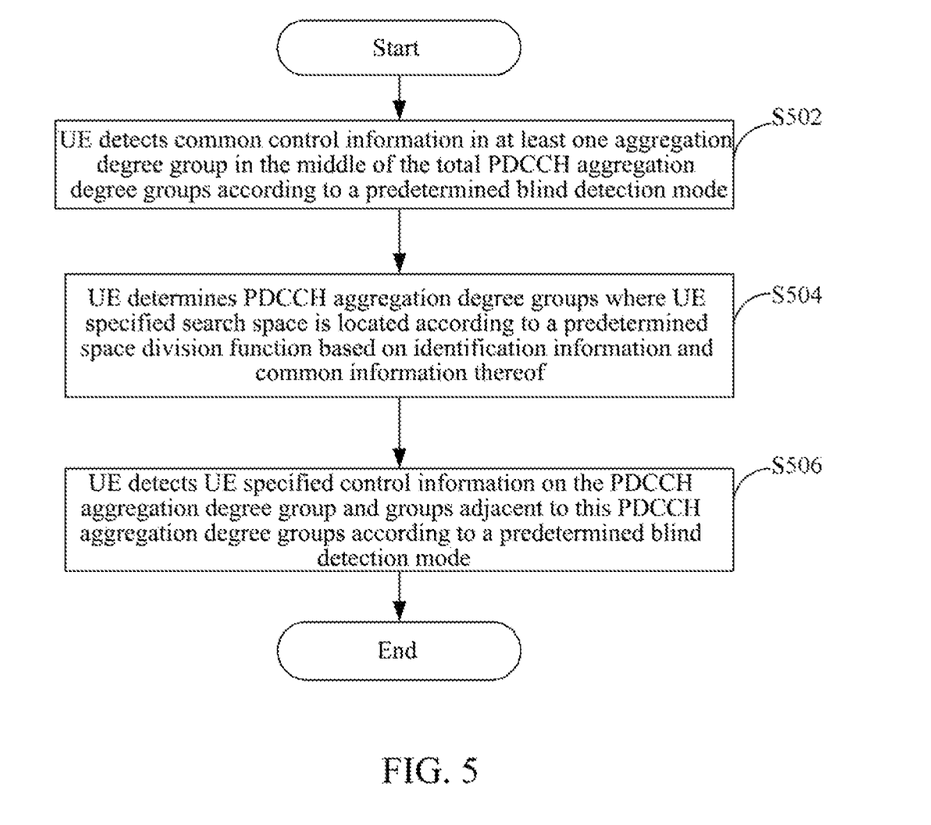
FIG. 5 is a flowchart illustrating a method for blind detection in accordance with one embodiment of this invention.

FIG. 5 is a flowchart showing a method for blind detection according to one embodiment of this invention. As shown in FIG. 5, the method comprises:

step S502, UE detects common control information in at least one aggregation degree group in the middle of the total PDCCH aggregation degree groups according to a predetermined blind detection mode;

preferably, common control information is detected in two aggregation degree groups (16 CCEs) in the middle of the total PDCCH aggregation degree groups; if the protocol changes, a common search space is determined according to the number of the common logical channels stipulated in the protocol;

step S504, UE determines the PDCCH aggregation degree group where UE specified search space is located according to a predetermined space division function based on identification information thereof and common information;

step S506, UE detects UE specified control information on the PDCCH aggregation degree group and groups adjacent thereto according to a predetermined blind detection mode.

Figure 6:
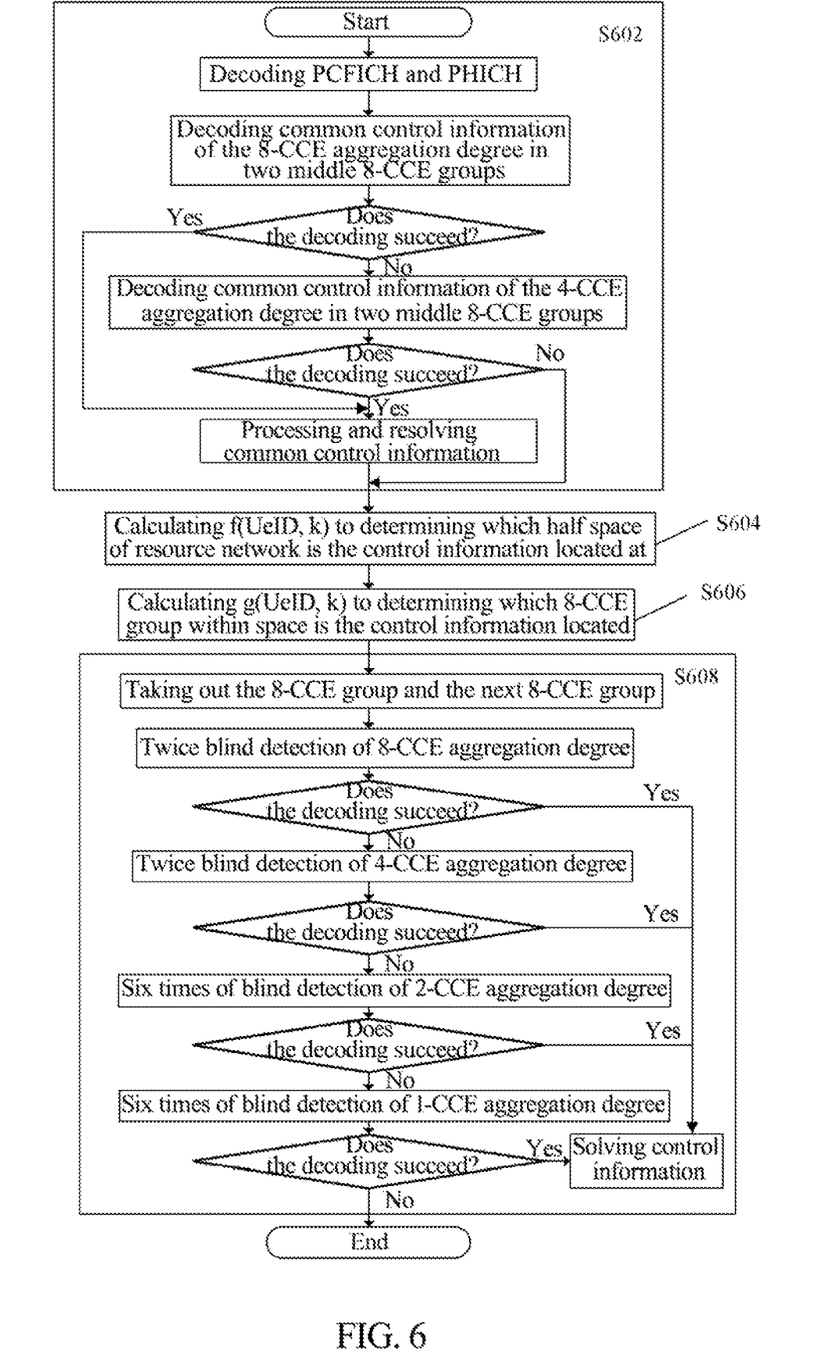
FIG. 6 is a flowchart of the preferred processing scheme of the method for blind detection in accordance with one embodiment of this invention.

The following describes the details of the above various processing in detail in combination with FIG. 6. FIG. 6 is a flowchart showing a preferred processing scheme of the method for blind detection according to one embodiment of this invention. As shown in FIG. 6, the flow comprises:

step S602, UE extracts the data of 2 middle L-CCE groups (continued from the above example L=8), and performs blind detection of common control information according to a predetermined detection mode. The detection mode herein comprises: an aggregation degree progressive increase mode or an aggregation degree progressive decrease mode;

first blind detection of CCE with the aggregation degree of 8 is performed (twice); if succeeds, blind detection of CCE with other aggregation degrees is not performed; and if not succeeds, blind detection of CCE with the aggregation degree of 4 is performed for four times; if succeeds, the specific content of control channel is resolved, and if not succeeds, it is indicated that the common control channel is not searched;

it needs to be explained that it is possible to randomly determine a mode for blind detection if UE has no prior information at the first detection, for example, a progressive increase mode; the average time for blind detection is analyzed after corresponding times of detection, and another mode is re-selected, for example, a progressive decrease mode, and then the average time of blind detection is analyzed after a plurality of times of repetition; the average times of the two are compared, and UE can select a blind detection mode with shorter blind detection time as a stable blind detection mode in a period of time since the number of resources occupied by UE specified scheduling information sent by the cell where the UE resides would not vary frequently in general; meanwhile, a threshold time of blind detection is set, and blind detection mode is re-selected when the threshold is exceeded;

step S604, UE determines sub-spaces of CCE occupied by specified control information using the same subspace division function f(UeID,k) as the base station, and UE can store the calculation results according to subframes so as to facilitate direct use in a subframe corresponding to the next frame;

step S606, UE determines the L-CCE group occupied by specified control information based on the same L-CCE group division function g(UeID,k) as the base station and extracts data of the L-CCE group and adjacent L-CCE groups. UE can also store the calculation results according to subframes so as to facilitate direct use in a subframe corresponding to the next frame;

step S608, UE performs blind detection on the extracted data of 2 L-CCEs by an aggregation degree progressive decrease (progressive increase) mode. First, blind detection of the 8-CCE aggregation degree is performed twice with the respective start points of 0 and 0; if not succeeds, then blind detection of the 4-CCE aggregation degree is performed twice within the previous L-CCE group with the start points of 0 and 4; if not succeeds either, then blind detection of the 2-CCE aggregation degree is performed on the previous 12 CCEs for six times with the start points of 0, 2, 4, 6, 0 (within the next L-CCE group), 2 (within the next L-CCE group); if still not succeeds, then blind detection of the 1-CCE aggregation degree is performed within the previous L-CCE group for six times with the start points of 0, 1, 2, 3, 4, 5; if sill cannot correctly decode, it is considered that specified control information belonging to this UE does not exist.

Apparatus Embodiment

According to one embodiment of this invention, a base station is further provided.

Figure 7:
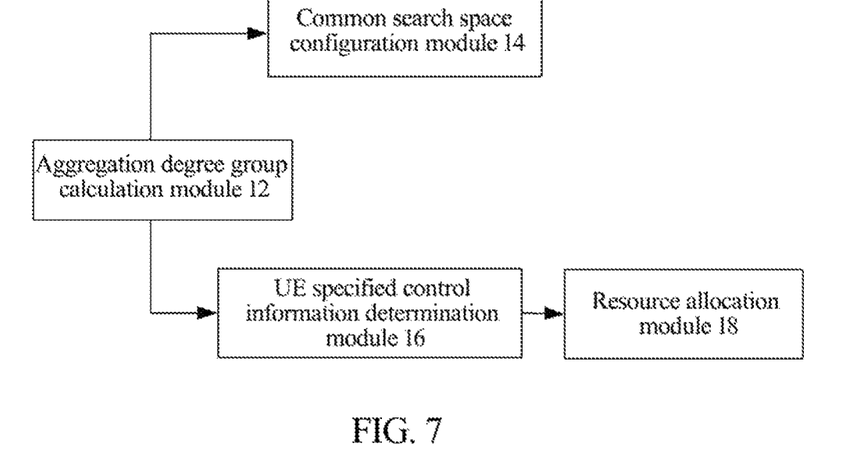
FIG. 7 is an architecture diagram of the base station in accordance with one embodiment of this invention.

FIG. 7 is an architecture diagram showing the base station in accordance with one embodiment of this invention. As shown in FIG. 7, the base station comprises: an aggregation degree group calculation module 12, a common search space configuration module 14, a UE specified control information determination module 16, and a resource allocation module 18.

The aggregation degree group calculation module 12 is configured to: calculate the number of PDCCH aggregation degree groups based on CCE resources that can be occupied by PDCCH in a subframe, wherein the largest PDCCH aggregation degree is taken as a PDCCH aggregation degree group; preferably, the largest PDCCH aggregation degree is 8 CCEs;

the common search space configuration module 14 is connected with the aggregation degree group calculation module 12 and is configured to: set at least one aggregation degree group in the middle of all the PDCCH aggregation degree groups as a common search space;

preferably, two aggregation degree groups in the middle of all the PDCCH aggregation degree groups are configured as common control information; if protocol changes, a common search space is determined based on the number of the common logical channel stipulated by the protocol;

the UE specified control information determination module 16 is connected with the aggregation degree group calculation module 12 and is configured to: determine a PDCCH aggregation degree group where the UE specified search space is located using a space division function based on UE information and public information; and a resource allocation module 18 is connected with the UE specified control information determination module 16 and is configured to: search the location of the UE specified search space within said determined PDCCH aggregation degree group to allocate PDCCH resources;

where the UE specified search space determination module 16 may comprises:

a space division sub module (not shown), which is configured to: divide the total PDCCH aggregation degree groups into a plurality of sub-spaces, wherein each sub-space includes a plurality of PDCCH aggregation degree groups;

the first determination sub module (not shown), which is configured to: determine sub-spaces where the UE specified search space is located using a sub-space division function, based on identification information of UE, the time slot number and the subframe number; and the second determination sub module (not shown), which is configured to: determine PDCCH aggregation degree groups within the sub-space where the UE specified search space is located by a base station using a group division function.

According to one embodiment of this invention, user equipment is further provided.

Figure 8:
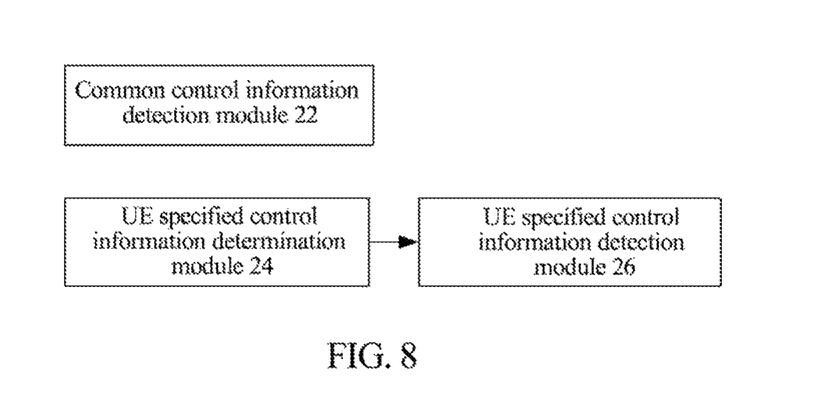
FIG. 8 is an architecture diagram of user equipment in accordance with one embodiment of this invention.

FIG. 8 is a diagram showing the structure of the user equipment in accordance with one embodiment of this invention. As shown in FIG. 8, the user equipment comprises: a common control information detection module 22, a UE specified control information determination module 24, and a UE specified control information detection module 26.

The public control information detection module 22 is configured to: detect common control information in at least one aggregation degree group in the middle of total PDCCH aggregation degree groups according to a predetermined blind detection mode, preferably, detect common control information in two aggregation degree groups in the middle of total PDCCH aggregation degree groups; the user equipment performs blind detection according to one of the following modes: an aggregation degree progressive increase mode and an aggregation degree progressive decrease mode; besides, the user equipment perform statistics study on a plurality of times of blind detection, a final detection mode is determined.

The UE specified control information determination module 24 is configured to: determine a PDCCH aggregation degree group where a UE specified search space is located according to a predetermined space division function based on identification information and common information of UE;

the UE specified control information detection module 26 is connected with the UE specified control information determination module 24 and is configured to: detect UE specified control information on the PDCCH aggregation degree group and groups adjacent thereto according to a predetermined blind detection mode;

where the UE specified control information determination module 24 comprises:

the first determination sub module (not shown), which is configured to: determine sub-spaces where the UE specified search space is located using a predetermined subspace division function; and the second determination sub module (not shown), which is configured to: determine PDCCH aggregation degree groups within the subspaces where the UE specified search space is set using a predetermined group division function.

System Embodiment

According to one embodiment of this invention, a system for allocating resources of PDCCH in LTE is further provided.

Figure 9:
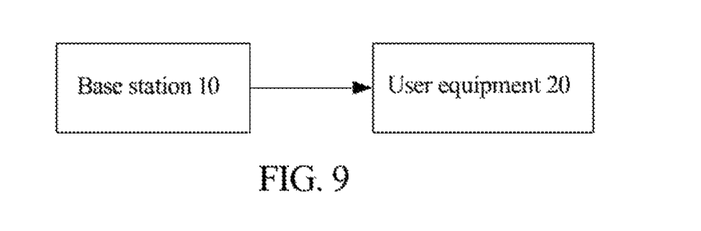
FIG. 9 is a diagram of the system for allocating resources in accordance with one embodiment of this invention.

FIG. 9 is a diagram showing a system for allocating resources in accordance with one embodiment of this invention. As shown in FIG. 9, the system comprises: a base station 10 and user equipment 20.

The base station 10 is connected with the user equipment 20, and the specific structures of the base station 10 and the user equipment 20 refer to FIG. 7 and FIG. 8, which are not repeated herein.

To sum up, according to the above technical scheme of this invention, grouping based on the largest CCE (L-CCE) aggregation degree and resource allocation of CCE with different aggregation degrees are performed to ensure unity of group numbers of selectable aggregation degrees within the L-CCE aggregation degree and achieve simplification of allocation mode. The middle of the resource grid is configured as a common search space. The resource space is divided into a plurality of sub-spaces by a division function, which reduces the size of the allocation space of the resources occupied by the specific UE specified control information. UE specified control information is determined in accordance with the process of the sub-space first and then L-CCE groups and finally CCE, which represents a resource allocation mode from the coarse granularity to the fine granularity and improves efficiency of PDCCH resource allocation.

The above description is only embodiments of this invention, but is not used for limiting this invention. It should be understood by those skilled in the art that this invention may include various modifications and changes. All variations, equivalent substitutions and improvement which within the spirit and essence of this invention shall fall into the scope of the claims of the invention.

Industrial Applicability

This invention ensures unity of the group numbers of selectable aggregation degrees within the L-CCE aggregation degree, achieves simplification of allocation modes, and improves efficiency of PDCCH resource allocation in accordance with grouping by the largest CCE aggregation degree and resource allocation of CCE with different aggregation degrees.

What is claimed is:

1. A method for allocating resources comprising:
   a base station calculating a number of Physical Downlink Control Channel (PDCCH) aggregation degree groups based on a maximum number of Control Channel Element (CCE) resources which can be occupied by PDCCH in a subframe, wherein a largest PDCCH aggregation degree is taken as a number of CCE resources per PDCCH aggregation degree group;
   the base station setting at least one aggregation degree group in middle of total PDCCH aggregation degree groups as a common search space;
   the base station determining PDCCH aggregation degree groups where a UE specified search space is located using a space division function based on User Equipment (UE) information and common information; and
   the base station searching a location of the UE specified search space in determined PDCCH aggregation degree groups where the UE specified search space is located and performing PDCCH resource allocation;
   wherein the step of determining the PDCCH aggregation degree group where the UE specified search space is located using the space division function comprises:
   the base station dividing the total PDCCH aggregation degree groups into a plurality of sub-spaces, wherein each sub-space includes a plurality of PDCCH aggregation degree groups;
   the base station determining sub-spaces where the UE specified search space is located using a sub-space division function, based on identification information of UE, a time slot number and a subframe number; and
   the base station determining PDCCH aggregation degree groups within the sub-spaces where the UE specified search space is located using a group division function.

2. The method according to claim 1, wherein the largest PDCCH aggregation degree is 8 CCEs.

3. The method according to claim 1, before the step of calculating the number of PDCCH aggregation degree groups, the method further comprising: the base station calculating the maximum number of CCE resources that can be occupied by the PDCCH based on following information: a number of cell antennae, a cell bandwidth and a control format indicator.

4. A method for blind detection comprising:
   User Equipment (UE) detecting common control information in at least one aggregation degree group in middle of total Physical Downlink Control Channel (PDCCH) aggregation degree groups according to a predetermined blind detection mode;
   the UE determining PDCCH aggregation degree groups where a UE specified search space is located according to a predetermined space division function based on identification information of UE and common information; and
   the UE detecting UE specified control information on PDCCH aggregation degree groups where the UE specified search space is located and groups adjacent to the PDCCH aggregation degree groups where the UE specified search space is located according to a predetermined blind detection mode;
   wherein the step of UE determining the PDCCH aggregation degree groups where the UE specified search space is located according to the predetermined space division function comprises:
   the UE determining a sub-space where the UE specified search space is located using a predetermined sub-space division function; and
   the UE determining the PDCCH aggregation degree groups within the sub-space where the UE specified search space is located using a predetermined group division function.

5. The method according to claim 4, before the step of the UE detecting common control information, the method further comprising:
   the UE performing statistics study on blind detection for a plurality of times, and determining a final blind detection mode.

6. The method according to claim 4, wherein the predetermined blind detection mode includes one of followings: an aggregation degree progressive increase mode and an aggregation degree progressive decrease mode.

7. A base station comprising:
   an aggregation degree group calculation module, which is configured to: calculate a number of Physical Downlink Control Channel (PDCCH) aggregation degree groups based on a maximum number of Control Channel Element (CCE) resources that can be occupied by PDCCH in a subframe, wherein a largest PDCCH aggregation degree is taken as a number of CCE resources per PDCCH aggregation degree group;

a common search space configuration module, which is configured to: set at least one aggregation degree group in middle of total PDCCH aggregation degree groups as a common search space;

a User Equipment (UE) specified control information determination module, which is configured to: determine PDCCH aggregation degree groups where a UE specified search space is located using a space division function based on UE information and common information; and a resource allocation module, which is configured to: search a location of the UE specified search space within determined PDCCH aggregation degree groups where the UE specified search space is located and perform PDCCH resource allocation;

wherein the UE specified search space determination module comprises:

a space division sub module, which is configured to: divide the total PDCCH aggregation degree groups into a plurality of subspaces, wherein each sub-space includes a plurality of PDCCH aggregation degree groups;

a first determination sub module, which is configured to: determine sub-spaces where the UE specified search space is located using a subspace division function based on identification information of UE, a time slot number and a sub frames number; and a second determination sub-module, which is configured to: determine PDCCH aggregation degree groups within the sub-spaces where the UE specified search space is located using a group division function.

8. The base station according to claim 7, wherein the largest PDCCH aggregation degree is 8 CCEs.

9. User Equipment (UE) comprising:

a common control information detection module, which is configured to: detect common control information in at least one aggregation degree group in middle of total Physical Downlink Control Channel (PDCCH) aggregation degree groups according to a predetermined blind detection mode;

a UE specified control information determination module, which is configured to: determine PDCCH aggregation degree groups where a UE specified search space is located according to a predetermined space division function based on identification information of UE and common information; and a UE specified control information detection module, which is configured to: detect UE specified control information on PDCCH aggregation degree groups where the UE specified search space is located and groups adjacent to the PDCCH aggregation degree groups where the UE specified search space is located according to a predetermined blind detection mode;

wherein the UE specified control information determination module comprises:

a first determination sub module, which is configured to: determine sub-spaces where the UE specified search space is located using a predetermined sub-space division function; and a second determination sub module, which is configured to: determine PDCCH aggregation degree groups within sub-space where the UE specified search space is located using a predetermined group division function.

10. The user equipment according to claim 9, wherein the common control information detection module is further configured to: perform statistics study on blind detection for a plurality of times, and determine a final detection mode.

11. The user equipment according to claim 9, wherein the predetermined blind detection mode includes at least one of an aggregation degree progressive increase mode and an aggregation degree progressive decrease mode.

* * * * *